MEMORY DRUM FOR COIN OPERATED RECORD PLAYER

Filed Sept. 23, 1958 2 Sheets-Sheet 1

Felix J. Grumann
INVENTOR.
BY Clarence A. O'Brien
and Harvey B. Jacobson
Attorneys

MEMORY DRUM FOR COIN OPERATED RECORD PLAYER

Filed Sept. 23, 1958 2 Sheets-Sheet 2

Felix J. Grumann
INVENTOR.
BY Clarence A. O'Brien
and Harvey B. Jacobson
Attorneys United States Patent Office 3,103,824

Patented Sept. 17, 1963

3,103,824

MEMORY DRUM FOR COIN OPERATED RECORD PLAYER

Felix J. Grumann, Laona, Wis.

Filed Sept. 23, 1958, Ser. No. 762,793

18 Claims. (Cl. 74—116)

This invention generally relates to a memory device and more particularly to a novel type of memory drum which may be utilized with coin operated record players for programming the records to be played in the order in which the selections were made.

Most coin operated record players now commercially utilized in the various establishments throughout the country have simple selection means whereby a customer may deposit a coin and hear his selection in due course, the records being played according to the order in which they are placed in the machine rather than the order in which the selections were made. That is, a scanning device in the record player scans the records in order and plays those records which have been selected. No consideration is given by the machine or scanning device to the order in which the selections were made. Furthermore, if a single record was selected twice, most record players would only play the records once as the scanning device passes the selected record position. Clearly, this conventional type of machine has undesirable features. Many people will recall sitting in restaurants hoping to hear their selected records played but never getting the opportunity because an unwarranted period of time lapsed due to the misorder of played selections. Another major disadvantage to the conventional type of machine is that if a record is selected twice, a customer loses the price of a selection because the record is only played once. In consideration of the above, the principal object of this invention is to provide a novel memory drum for utilization with coin operated record players which is capable of playing a plurality of records in the order in which they were selected and of storing or memorizing future selections.

It is a further object of this invention to provide a memory drum which may be utilized in various fields where the programming of a sequential operation is desired.

It is a still further object of this invention to provide a novel memory device which is reliable, relatively simple, and comparatively inexpensive to manufacture.

In accordance with the above stated objects, below is particularly described the construction and operation of a novel memory drum which may be utilized wherever a sequential operation is to be programmed but which is particularly adaptable for use with a coin operated record player. The memory drum initially consists of a hollow cylindrical housing having a plurality of rows of pivotally attached cams arranged on the cylinder in a circumferential manner. Each of the rows includes a plurality of selectively movable cams with the cams of the various rows being aligned along the length of the cylinder to form parallel files. Each of the cams includes a first arcuate portion positioned adjacent the outer surface of the cylinder and a second arcuate portion fixed to the first arcuate portion. The second arcuate portion has its ends bent toward the cylindrical housing relative to its center. The second arcuate portion extends into said cylindrical housing through a series of slots in the housing. The construction of the second arcuate portion allows for the cam to be frictionally held in either of two extreme pivoted positions by the housing portions forming the slots. Concentrically positioned within the cylindrical housing is a shaft rotatable with respect to the cylindrical housing. The shaft fixedly carries a series of solenoids. Each of the solenoids are aligned with a row of cams and each solenoid has a movable armature which is adapted to pivot a selected cam. With the shaft inside of the cylindrical housing and able to rotate with respect thereto and with a particular solenoid aligned with each row of cams, it should be apparent that any cam on the cylindrical housing could be pushed outwardly by the armature of the solenoid. The movable shaft has a coil spring attached thereto for urging the shaft to turn. The cylindrical housing carries a row of rigid pins which cooperate with an escapement and carried by the shaft for locking the shaft to the cylindrical housing. A lever is supported by the shaft and positioned proximate the movable armatures of the solenoids and connected to the escapement whereby upon energization of the solenoid, the movable armatures pivot the lever to release the escapement whereby the coil spring may rotate the shaft with respect to the cylindrical housing. A reciprocally driven arm is externally positioned with respect to the cylindrical housing adjacent the row of rigid pins. The arm has a terminal hook adapted to cooperate with the rigid pins for rotating the cylindrical housing in a ratchet like manner. The arm rotates the cylindrical housing after an operation is completed and places the housing in a position to dictate the next operation.

It is to be noted that a file of cams along the length of the cylinder indicates a position of selection. The plurality of files on the cylinder reveals how many operations may be pre-selected. The rows of cams correspond to particular operations. The solenoids within the cylindrical housing are capable of moving the desired cams within a file upon an energization of the solenoid from a selected electrical circuit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 2, 3, 4:
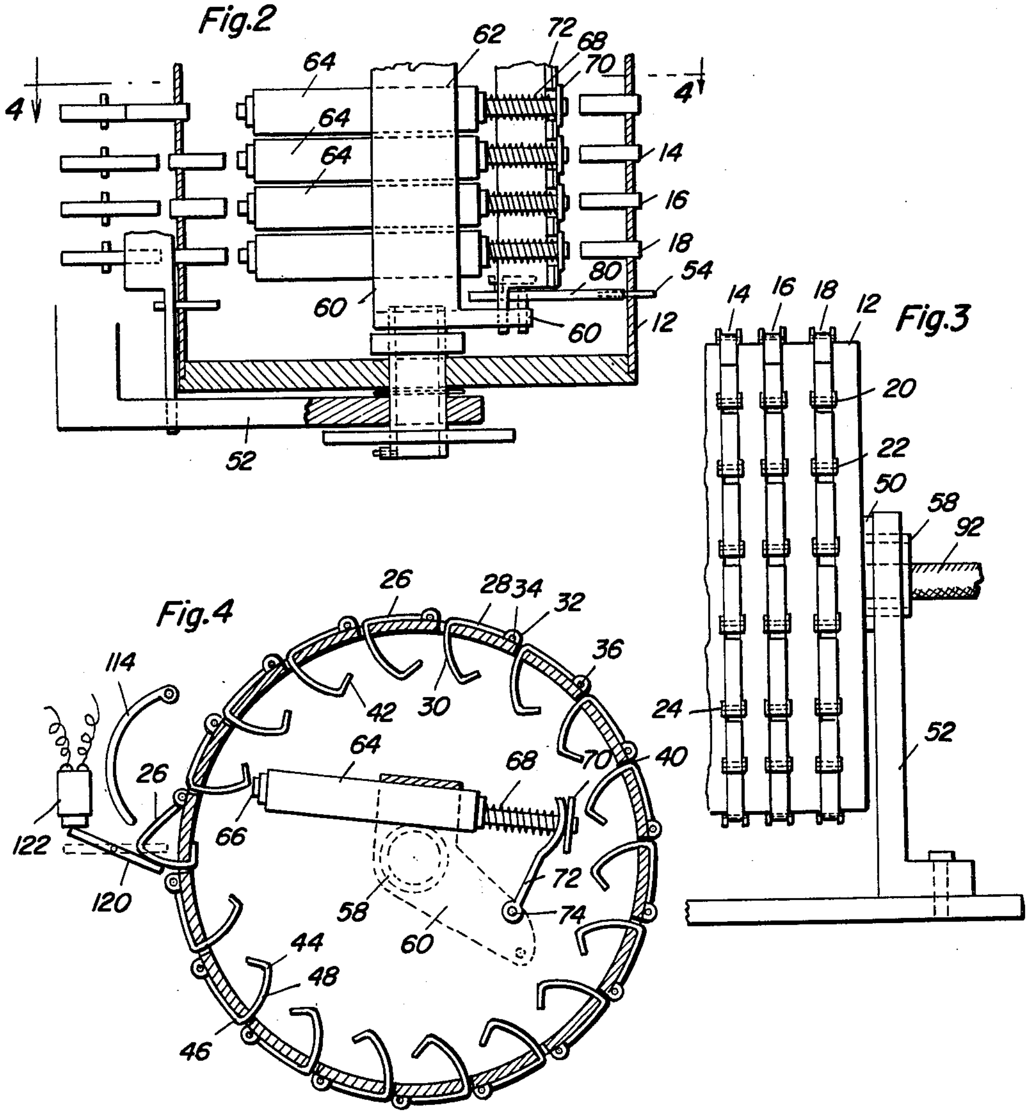
FIGURE 2 is a top sectional view showing the solenoids carried inside the length of the cylindrical housing.
FIGURE 3 is a side elevational view illustrating a circumferential portion of the cylindrical housing.
FIGURE 4 is a sectional view taken substantially along the plane 4—4 of FIGURE 2.

With continuing reference to the drawings, the numeral 10 generally represents the memory drum having a cylindrical housing 12. Particularly referring to FIGURE 3, on the cylindrical surface of the cylindrical housing 12 are rows of cams represented by numerals 14, 16 and 18. Each of the rows 14, 16 and 18 includes a plurality of aligned cams which form parallel files designated as 20, 22 and 24 along the length of the cylinder. Each cam 26 includes a first arcuate portion 28 and second arcuate portion 30 integrally formed with the first arcuate portion 28. A plurality of pairs of ears 32 have apertures 34 therethrough for passing a spindle 36. The first arcuate portion 28 also has a terminal aperture passing spindle 36 whereby the cam may be pivoted about the spindle 36. A series of slots 40 are formed in the cylindrical housing 12 and the second arcuate portion 30 passes through these slots. The cams 26 have a third portion 42 terminally and integrally formed with the second arcuate portion 30. It is to be noted that the ends 44 and 46 of the arcuate portion 30 are bent inwardly relative to the center of the arcuate portion 48. The cams 26 are constructed of a somewhat resilient material whereby the end portions 44 and 46 of the arcuate portion 30 may frictionally grip the edges of the slots 40 whereby the cams may be held in either of two extreme pivoted positions. The cylindrical housing 12 is mounted for rotatable movement on axis 50 supported by frame 52. It is contemplated that the cylindrical housing 12 have a plurality of rows 14, 16 and 18 and a plurality of files 20, 22 and 24. Of course, the number of files determine the number of operations which may be preselected. The number of rows determine the number of various operations which the memory drum is capable of dictating. Further, the cylindrical housing 12 carries a single row of rigidly fixed pins 54 which extend on either side of the cylindrical housing surface. The extensions 56 and 58 on either side of the surface are formed integral with each other and form an obtuse angle therebetween.

Positioned within the cyindrical housing 12 is a rotatable shaft 58 which may rotate independently of any action on the part of the cylindrical housing 12. A member 60 is fixed on the shaft 58 and carried thereby. The member 60 includes a series of apertures 62. Held in the apertures 62 are solenoid coils 64 which contain movable armatures 66. The armatures 66 are spring urged by spring 68 concentrically carried about the armature 66 between an end portion of the coil 64 and an armature flange 70.

A lever 72 is pivotally connected to the member 60 at 74 and extends upward proximate the armature 66. The lever 72 includes a series of slots 76 which include the armature 66. Though the slots 76 are large enough to include the armature 66, they are not large enough to pass the armature flanges 70. Also pivoted to the member 60 at 78 is a pawl 80 having a hook end 82. The pawl 80 is linked to the lever 72 by an arm 84 which is positioned between two projections 86 and 88 on the pawl 80.

A coil spring 90 is terminally affixed to the shaft 58 and urges its rotational movement with respect to the frame 52. An aperture in the frame 52, shaft 58, and axis 50 passes a cable 92 carrying the electrical wires for the energization of the individual solenoids 64.

Figures 1, 9:
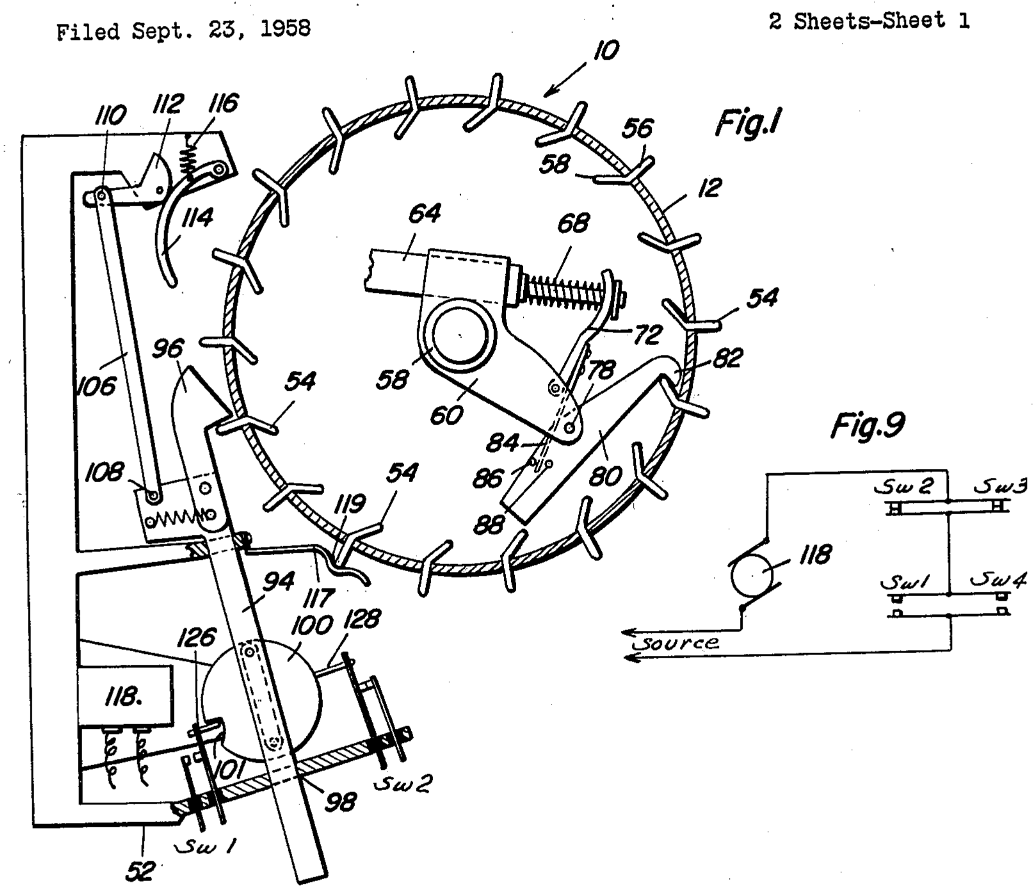
FIGURE 1 is an end sectional view illustrating the cylindrical housing with the row of rigid pins and the solenoid carrying shaft therein. Also, the external means for driving the cylindrical housing is shown.
FIGURE 9 is a circuit diagram indicating the switches utilized with the drive motor.
Figures 5, 6:
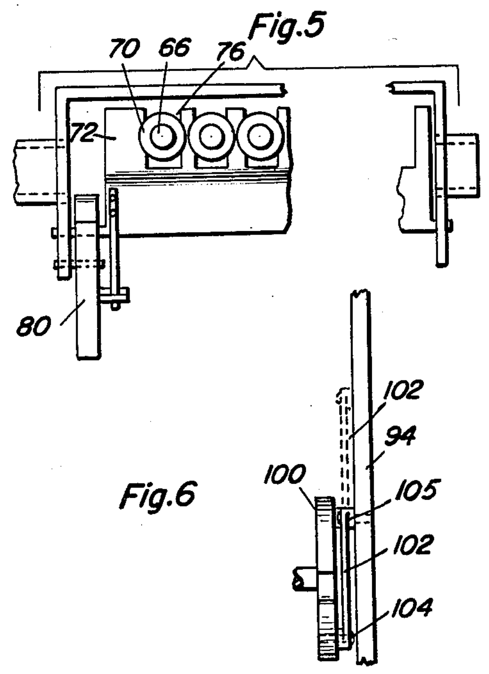
FIGURE 5 is a fragmentary elevational view indicating the relationship between the movable armature and the lever.
FIGURE 6 is a side elevational view illustrating the linkage between the wheel and arm driving the cylindrical housing.
Figure 8:
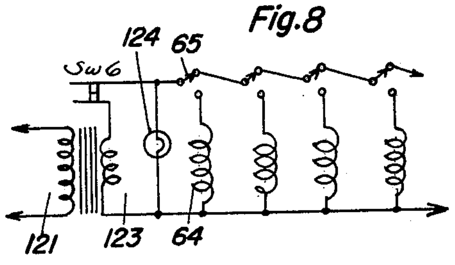
FIGURE 8 is a circuit diagram illustrating the circuit for the individual energization of the solenoids.

Externally carried by the frame 52 is an arm 94 having a hook end 96 adapted to cooperate with the rigid pins. The arm 94 passes through arm guides 98 which are aligned apertures in the frame 52. The arm 94 may be reciprocally driven within the arm guide 98 by the wheel 100 through linkage 102. That is, with the linkage 102 pivotally fastened as 104 to the wheel and pivotally fastened at 105 to the arm, a rotational movement of the wheel 100 (assume a clockwise movement in FIGURE 1) will carry pivotal connection 104 upwardly and force arm 94 upwardly. This situation is depicted in FIGURE 6. As the wheel 100 carries the pivotal connection 104 downwardly, the arm 94 will be carried within the arm guide 98 downwardly. Referring to FIGURE 1, an upward movement of the arm 94 will not cause the hook 96 to touch the rigid pins 54. However, when the arm 94 moves downwardly the hook 96 abuts the pin 54 and rotates the cylindrical housing 12 counterclockwise in FIGURE 1. The arm 94 is pivotally connected to a link 106 at point 108.

The link 106 in turn is pivotally connected at 110 to a pivotal cam 112 which bears against a pivotally supported finger 114. The finger 114 is spring urged by spring 116 upwardly in FIGURE 1 but the pivotal cam 112 may depress the finger 114 whereby the finger 114 may bear against and push back an outwardly extending cam as at 26. A detent 117 is carried by the frame 52 and includes a depression 119 for accommodating the pins 54 when the memory drum is to remain in a particular position.

A small motor 118 is provided for driving the wheel 100 upon proper energization. The utilization and operation of the electrical features and switches of this embodiment will be understood after reading the step-by-step operation now to be considered.

Initially it must be understood that each cam of a particular file of cams and its corresponding row represents a single operation. That is, looking at a particular row, any cam in that row would for instance, cause a phonograph to play a particular selection. Noting FIGURE 4, one of the cams 26 is projecting outwardly and bearing on pivotal arm 120 which in turn bears against and closes microswitch 122 to play a particular record. Further, it is to be understood that each successive file represents a successive programmed operation. Now, for example, if all the cams in a particular row 18 were extended, a particular record would play 17 successive times. (Though 18 cams are shown, one row is intended to be utilized as a stop position and cannot be utilized for programming.) When a particular solenoid coil 64 is energized by the depression of switch 65 the movable armature 66 will bear against the cam portion 42 and force the cam outwardly as shown at 26. The coil 64 may be energized from a primary source 121 through a switch SW6 and a secondary coil 123. When a coin is inserted in the slot, the normally open switch SW6 closes activating the secondary coil 123 and illuminating the indicating light 124. The illumination of the indicating light 124 indicates to a customer that the switch 65 may be depressed to energize a coil 64. As noted above, when the coil 64 is energized, the movable armature 66 moves a cam outwardly. As the movable armature moves, the armature flange 70 pivots the lever 72 with respect to the member 60 carrying the arm 84 to bear against projection 88 on pawl 80. As the hooked end 82 of pawl 80 moves upwardly due to this pivotal movement, the coil spring 90 carries the shaft 58 clockwise (FIGURE 1) until the hook 82 engages the next successive rigid pin 54. It is apparent then that the solenoids have moved one successive file with respect to the cylindrical housing and another selection may be made.

Figure 7:
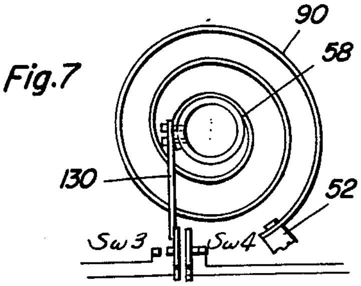
FIGURE 7 is a schematic diagram showing the coil spring utilized with the shaft.

Now let us assume that a record is playing and the device is in the position of FIGURE 1. When the record stops a reject switch SW4 closes to energize motor 118. The energization of motor 118 turns the wheel 100. The wheel 100 has a depression 101 therein. As the wheel 100 turns, the circumference of the wheel bears against a projection 126 to close switch SW1 to keep the motor going and the wheel turning. Also, the arm 94 is moving upwardly at this instant. When the depression 101 reaches the projection 128, switch SW2 opens and the motor 118 apparently stops. However, if additional operations are programmed on the memory drum, switch SW3 shown in FIGURE 7 has been closed and the motor 118 will continue to run carrying arm 94 downwardly and rotating the cylindrical housing 12 of FIGURE 1 in a counterclockwise direction. Since the pawl 80 is hooked on as at 82 to a rigid pin 54 the shaft 58 with the solenoids 64 will be carried counterclockwise also. It is to be noted that the switch SW3 is operated by a projection 130 fixed to shaft 58. It is only when the shaft 58 is in a particular position, when there are no operations programmed, that the projection 130 will open the switch SW3. Also, to be noted is that as the arm 94 was driven upward, the finger 114 was being pivoted downward to force the cam 26 back against the surface of the cylindrical housing. To continue with the cycle, if the switch SW3 is closed the motor 118 will continue to turn the wheel 100 until a position as shown in FIGURE 1 is again assumed. A paricular cam in the file which has just moved adjacent the pivotally supported series of arms 120 will pivot an arm 120 to actuate a particular microswitch 122 to perform the preselected operation or, for instance, to play a particular preselected record. If selections have been programmed which fill all the files, the projection 130 will be impeded by a portion of the frame 52 and since the shaft 58 is no longer then spring urged opposite to the direction of movement of the cylindrical housing, further selections or programming cannot be made. If the switch SW4 closes after a record is rejected, and there are no further operations programmed, the switch SW3 will be opened and when the depression 101 was proximate the projection 128, the motor 118 would stop leaving the arm 94 in the raised position with the cam dictating the last operation, recently pushed in by the finger 114.

It is thought apparent that the above disclosure lucidly explains the features and operation of the present embodiment whereby it will be clearly and easily understood by one skilled in the art.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A mechanical memory drum comprising a hollow cylindrical housing, a plurality of circumferential rows of cams arranged on said cylinder, each of said rows including a plurality of selectively movable cams extending circumferentially about said cylinder, said cams being aligned along the length of said cylinder to form parallel files, each of said cams having a first portion pivotally connected by pivot means to the outer surface of said cylindrical housing, slots in said cylindrical housing spaced from said pivotal connection, a second portion fixed to said first arcuate portion and extending generally radially into the interior of said cylindrical housing through said slots, operating means within said housing arranged to pivot each of said cams about said pivot means whereby said second portion projects outwardly beyond the outer circumferential surface of said cylinder.

2. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions.

3. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams.

4. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams.

5. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams.

6. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction.

7. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoid, said lever linked to said pawl whereby a pivotal movement of said lever unlocks the shaft from said cylinder.

8. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent twoard said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoid, said lever linked to said pawl whereby a pivotal movement of said lever unlocks the shaft from said cylinder, a coil spring terminally fixed to said shaft for urging the rotational movement of said shaft.

9. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoid, said lever linked to said pawl whereby a pivotal movement of said lever unlocks the shaft from said cylinder, a coil spring terminally fixed to said shaft for urging the rotational movement of said shaft, and external means for limitedly rotating said cylinder in a direction opposite to the urged rotation of said shaft.

10. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoid, said lever linked to said pawl whereby a pivotal movement of said lever unlocks the shaft from said cylinder, a coil spring terminally fixed to said shaft for urging the rotational movement of said shaft, and external means for limitedly rotating said cylinder in a direction opposite to the urged rotation of said shaft, said external means including an arm engageable with said rigid pins externally of said cylindrical surface, driving means for reciprocally driving said arm.

11. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams having a first arcuate portion terminally and pivotally connected to the outer surface of said cylindrical housing, slots in said cylindrical housing spaced from said pivotal connection, a second arcuate portion fixed to said first arcuate portion and extending into the interior of said cylindrical housing through said slots, said second arcuate portion having its ends bent toward said cylindrical housing relative to its center for frictionally engaging said housing whereby said cam may be selectively frictionally held in either of two positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoid, said lever linked to said pawl whereby a pivotal movement of said lever unlocks the shaft from said cylinder, a coil spring terminally fixed to said shaft for urging the rotational movement of said shaft, and external means for limitedly rotating said cylinder in a direction opposite to the urged rotation of said shaft, said external means including an arm engageable with said rigid pins externally of said cylindrical surface, driving means for reciprocally driving said arm, said driving means including a wheel, a switch adjacent said wheel, operating means carried by said wheel for operating said switch, an energy source, said switch controlling said energy source for driving said wheel, a link pivotally connected between said arm and said wheel and a guide for said arm whereby said arm moves reciprocally in response to said wheel.

12. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, solenoid selection means carried by a shaft within said cylinder for selectively moving said cams, a circumferential row of rigid pins carried by said cylinder and extending on either side of the surface thereof, a pawl carried by said shaft and engageable with said rigid pins for preventing relative rotation between said shaft and cylinder in at least one direction, selectively actuatable means for unlocking said shaft from said cylinder, a coil spring terminally fixed to said shaft for urging the rotational movement of said shaft and external means for limitedly rotating said cylinder in a direction opposite to the urged rotation of said shaft, said external means including an arm engageable with said rigid pins externally of said cylindrical surface, driving means for reciprocally driving said arm, said driving means including a wheel, a switch adjacent said wheel, operating means carried by said wheel for operating said switch, an energy source, said switch controlling said energy source for driving said wheel, a link pivotally connected between said arm and said wheel and a guide for said arm whereby said arm moves reciprocally in response to said wheel.

13. A mechanical memory drum comprising a hollow cylindrical housing, a plurality of rows of cams arranged on the periphery of said cylinder, each of said rows including a plurality of selectively movable cams extending circumferentially about said cylinder, said cams being aligned along the length of said cylinder to form parallel files, each of said cams pivotally connected to the outer surface of said cylindrical housing, means retaining each of said cams in either of two extreme pivoted positions, means carried inside said drum for pivoting selective cams, said means including a series of solenoids, said solenoids being aligned with said circumferential cam rows, each of said solenoids including a movable armature for pivoting said cams.

14. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams pivotally connected to the outer surface of said cylindrical housing, means retaining each of said cams in either of two extreme pivoted positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams.

15. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams pivotally connected to the outer surface of said cylindrical housing, means retaining each of said cams in either of two extreme pivoted positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction.

16. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams pivotally connected to the outer surface of said cylindrical housing, means retaining each of said cams in either of two extreme pivoted positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoid, said lever linked to said pawl whereby a pivotal movement of said lever unlocks the shaft from said cylinder.

17. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams pivotally connected to the outer surface of said cylindrical housing, means retaining each of said cams in either of two extreme pivoted positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoids, said lever linked to said pawl whereby a pivotal movement of said lever unlocks the shaft from said cylinder, a coil spring terminally fixed to said shaft for urging the rotational movement of said shaft.

18. A mechanical memory drum comprising a hollow cylindrical housing, a plurality of rows of cams arranged on said cylinder, each of said rows including a plurality of selectively movable cams extending circumferentially about said cylinder, said cams being aligned along the length of said cylinder to form parallel files, each of said cams pivotally connected to the outer surface of said cylindrical housing, means retaining each of said cams in either of two extreme pivoted positions, means carried inside said drum for pivoting selective cams, said means including a series of solenoids, said solenoids being aligned with said circumferential cam rows, each of said solenoids including a movable armature for pivoting said cams, a shaft concentrically positioned within said cylindrical housing and adapted to rotate with respect thereto, said series of solenoids fixedly carried by said shaft whereby said solenoids may be positioned adjacent a particular file of cams, a circumferential row of rigid pins carried by said cylindrical housing and extending on either side of the surface thereof, a pawl carried by said shaft and engageable with said pins for preventing relative rotation between said shaft and cylinder in at least one direction, a lever pivotally supported from said shaft adjacent said armatures, means carried by said armatures for pivoting said lever upon an energization of said solenoids, said lever linked to said pawl whereby a pivotal movement of said lever unlocks the shaft from said cylinder, a coil spring terminally fixed to said shaft for urging the rotational movement of said shaft, and external means for limitedly rotating said cylinder in a direction opposite to the urged rotation of said shaft.

References Cited in the file of this patent

UNITED STATES PATENTS

| | | |
|---|---|---|
| 28,716 | Gore | June 12, 1860 |
| 864,048 | Tropp | Aug. 20, 1907 |
| 1,189,871 | Roberts | July 4, 1916 |
| 2,083,722 | La Via | June 15, 1937 |
| 2,163,864 | Bissell | July 27, 1939 |
| 2,444,495 | Chase | July 6, 1948 |
| 2,536,133 | Klammer et al. | Jan. 2, 1951 |
| 2,553,846 | Clemens | May 22, 1951 |
| 2,572,609 | Gierwiatowski | Oct. 23, 1951 |
| 2,591,650 | Williams | Apr. 1, 1952 |
| 2,601,154 | Krueger et al. | June 17, 1952 |
| 2,667,024 | Hauswirth | Jan. 26, 1954 |
| 2,690,800 | Ross | Oct. 5, 1954 |
| 2,767,788 | Parker | Oct. 23, 1956 |
| 2,770,975 | Galley | Nov. 20, 1956 |
| 2,796,519 | Papouschek | June 18, 1957 |
| 2,899,622 | Greenwald | Aug. 11, 1959 |
| 3,006,174 | Haddad | Oct. 31, 1961 |
| 3,034,370 | Hall | May 15, 1962 |
| 3,063,301 | Hall | Nov. 13, 1962 |
| 3,069,614 | Steinert | Dec. 18, 1962 |